April 15, 1924.

S. E. McQUEEN

WEIGHING MACHINE

Filed Aug. 7, 1922

1,490,672

INVENTOR.

Samuel E. McQueen

BY Morsell & Keeney,

ATTORNEYS.

Patented Apr. 15, 1924.

1,490,672

UNITED STATES PATENT OFFICE.

SAMUEL E. McQUEEN, OF MILWAUKEE, WISCONSIN.

WEIGHING MACHINE.

Application filed August 7, 1922. Serial No. 580,229.

*To all whom it may concern:*

Be it known that I, SAMUEL E. McQUEEN, a citizen of the United States, and resident of Milwaukee, in the county of Milwaukee and State of Wisconsin, have invented new and useful Improvements in Weighing Machines, of which the following is a description, reference being had to the accompanying drawings, which are a part of this specification.

This invention relates to improvements in weighing machines, and more especially to weighing machines or scales particularly adapted for weighing paper.

In ascertaining the weight of paper per ream a piece of paper cut to a given size is weighed and the total weight of the ream, figured on the basis of 500 sheets to the ream, is then determined.

That part of the paper industry which deals in fine paper usually handles the same in three standards: that is 25 x 38 for book papers, 24 x 36 for envelope manila, greaseproof, glassine, etc., and 22 x 34 for bond papers and writing paper. In determining the weight per ream of any of this paper a sample piece cut to a given size is weighed and then the weight of the ream computed therefrom. However, scales heretofore used have not taken account of the several standard sizes of the sheets, and hence computation of the weight per ream must necessarily include the area of the sheets forming the particular ream being weighed.

It is therefore the primary object of this invention to provide a scale having three lines of graduations thereon, which will indicate at once the weight of a ream of paper of any of the three standard sizes. One line of graduations is computed with a sheet measuring 25 x 38 as the basis, another line of graduations is computed with a sheet of 24 x 36 as the basis and the third line of graduations is computed with a sheet measuring 22 x 34 as the basis. Therefore, when a sample sheet of the given size is weighed, the weight per ream for any of the three standard sizes of sheets may be immediately ascertained.

The details of construction of this invention will be made more apparent as the description proceeds, especially when considered in connection with the accompanying drawings wherein one physical embodement of the invention is illustrated.

Figure 1:
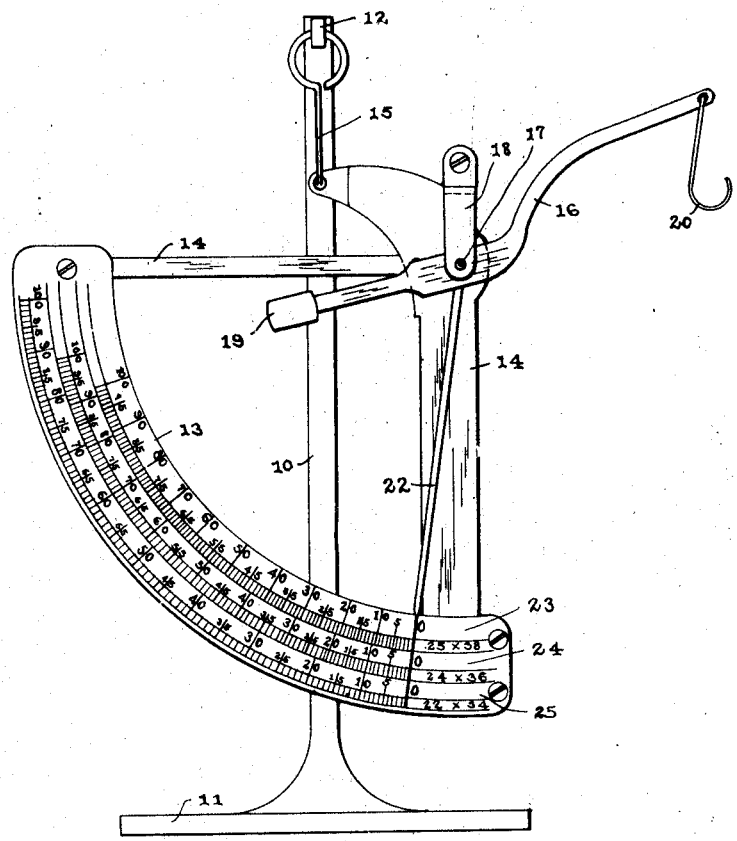
Figure 1 is a front elevation of a weighing device constructed in accordance with this invention.
Figure 2:
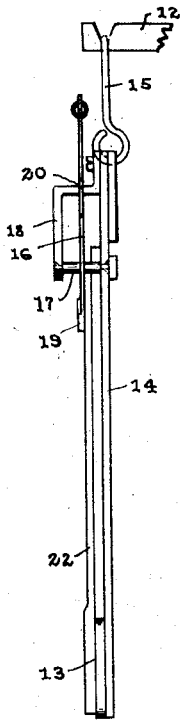
Fig. 2 is a fragmentary side elevation of the structure illustrated in Fig. 1; and, Fig. 3 is the form used in obtaining the sample sheet to be weighed.
Figure 3:
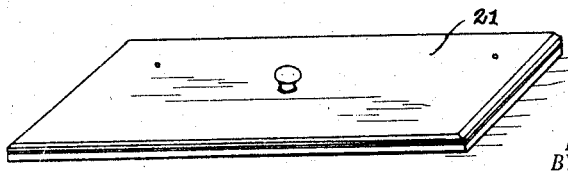

Referring now more particularly to the drawings wherein like reference characters indicate like parts throughout, it will be noted that there is illustrated a standard 10 which projects upwardly from a base 11, the weighing parts proper being suspended from an angular piece 12 projecting from the standard 10.

An arc-shaped member 13, having secured thereto a pair of angular supporting members 14, is suspended by means of a link 15, from the supporting arm 12.

A scale beam 16 is pivotally mounted on a pivot rod 17 which extends between an arm 18 and one of the supporting arms 14 of the sector. One end of the scale beam is weighted as at 19 and the other end thereof is provided with a hook 20, on which the sample sheet of paper to be weighed is hung.

The sheet of paper which is weighed, is torn from a larger sheet by placing thereon a forming plate 21, the paper of the sheet being torn away around the edges of the forming plate 21 with the result that a sheet of paper of a size equal to that of the forming plate 21 is obtained. As mentioned hereinbefore, this sheet is caused to engage the hook 20 of the scale beam, the weight of a ream of 500 sheets being ascertainable from the weight of the sample sheet.

Co-operating with the scale beam 16 and projecting therefrom, is an indicating hand or pointer 22, this indicating hand playing over three lines of graduations or scales 23, 24, and 25, arranged on the arc-shaped member 13. As shown in Fig. 1, these three lines of graduations are computed in accordance with the areas of the three standard sizes of sheets used. Therefore, should a sample sheet, torn from a sheet measuring 25 x 38, be caused to engage the hook, the resulting amount indicated on the scale 23 will be the weight of a ream of 500 sheets measuring 25 x 38. In a like manner, the weight of reams of paper, the sheets of which measure either of the other two sizes, may be also immediately determined.

Obviously, the basis upon which the lines of graduations are computed, as well as the number of lines of graduations, may be varied so as to adapt this scale for use where paper in other sizes is handled.

While the construction of the parts of the weighing machine is simple and efficient, it is not intended that the invention be unnecessarily limited in this respect, but reservation is made to make such changes as may come within the purview of the accompanying claims.

Having thus described the invention, what is claimed is:

1. In a weighing device of the class described, a supporting standard, an arc-shaped member suspended thereform, a weighted scale beam pivoted to said arc-shaped member suspended therefrom, a by said scale beam, said arc-shaped member having delineated thereon three lines of graduations computed in accordance with standard sizes of paper sheets to indicate the weight in pounds from small samples.

2. In a weighing machine for paper and the like, a standard, an arc-shaped member suspended from said standard, a weighted scale beam pivoted to said arc-shaped member, an indicating hand connected to said scale beam, said arc-shaped member having delineated thereon three lines of graduations, computed in accordance with three different sizes of paper sheets and a hook carried by one end of said scale beam and adapted to engage a sample sheet of paper to be weighed.

3. In a paper scale of the class described, a supporting standard, an arc-shaped member, a pair of supporting arms for said arc-shaped member, means pivotally suspending said arc-shaped member from said standard, a weighted scale beam pivotally suspended from one of the supporting arms of said arc-shaped member, a hook secured to one end of said scale beam and adapted to be engaged by a sample sheet of paper of a given size to be weighed, an indicating hand secured to said scale beam, said arc-shaped member having delineated thereon three lines of graduations, computed in accordance with three standard sizes of paper sheets on the basis of five hundred sheets to the ream, said indicating hand co-operating therewith to indicate the weight per ream of sheets of a given area.

In testimony whereof, I affix my signature.

SAMUEL E. McQUEEN.

Certificate of Correction.

It is hereby certified that in Letters Patent No. 1,490,672, granted April 15, 1924, upon the application of Samuel E. McQueen, of Milwaukee, Wisconsin, for an improvement in "Weighing Machines," an error appears in the printed specification requiring correction as follows: Page 2, line 19, claim 1, strike out the words " suspended therefrom, a " and insert instead the comma and words , *an indicating hand actuated;* and that the said Letters Patent should be read with this correction therein that the same may conform to the record of the case in the Patent Office.

Signed and sealed this 10th day of June, A. D. 1924.

[SEAL.]

KARL FENNING,
*Acting Commissioner of Patents.*